(12) United States Patent
Nagoya et al.

(10) Patent No.: US 11,055,551 B2
(45) Date of Patent: Jul. 6, 2021

(54) CORRECTION SUPPORT DEVICE AND CORRECTION SUPPORT PROGRAM FOR OPTICAL CHARACTER RECOGNITION RESULT

(71) Applicant: WingArc1st Inc., Tokyo (JP)

(72) Inventors: Yutaka Nagoya, Tokyo (JP); Ko Shimazawa, Tokyo (JP)

(73) Assignee: WINGARC1ST INC., Tokyo (JP)

( * ) Notice: Subject to any disclaimer, the term of this patent is extended or adjusted under 35 U.S.C. 154(b) by 127 days.

(21) Appl. No.: 16/666,861

(22) Filed: Oct. 29, 2019

(65) Prior Publication Data
US 2020/0134349 A1 Apr. 30, 2020

(30) Foreign Application Priority Data
Oct. 30, 2018 (JP) .............................. JP2018-204444

(51) Int. Cl.
*G06K 9/03* (2006.01)
*G06K 9/62* (2006.01)
*G06K 9/20* (2006.01)

(52) U.S. Cl.
CPC ............... *G06K 9/033* (2013.01); *G06K 9/03* (2013.01); *G06K 9/2081* (2013.01); *G06K 9/6263* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 6,453,079 B1 * | 9/2002 | McInerny | G06K 9/033 382/311 |
| 6,826,317 B2 * | 11/2004 | Fujino | G06K 9/03 382/156 |

(Continued)

FOREIGN PATENT DOCUMENTS

JP    H11-102414 A    4/1999

OTHER PUBLICATIONS

Clausner C, Pletschacher S, Antonacopoulos A. Flexible character accuracy measure for reading-order-independent evaluation. Pattern Recognition Letters. Mar. 1, 2020;131:390-7. (Year: 2020).*

(Continued)

*Primary Examiner* — Kim Y Vu
*Assistant Examiner* — Nathan J Bloom
(74) *Attorney, Agent, or Firm* — Polsinelli PC (57) ABSTRACT

A correction history recording unit that records region information of a correction site with respect to text data converted from an original image as correction history information, an accuracy calculation unit that calculates accuracy of optical character recognition for each of individual regions on a layout of the original image on the basis of the correction history information, a distribution image generation unit and a distribution image display unit which generate and display a distribution image in which a difference in magnitude of accuracy is shown as a difference in a display aspect for every individual region are included so as to generate and display the distribution image that is distinguished for every individual region by reflecting a tendency in which a character recognition rate in a certain region on a layout of the original image may decrease due to various cases including a format of an original document, a state of an OCR device, and the like.

6 Claims, 7 Drawing Sheets

(56) References Cited

U.S. PATENT DOCUMENTS

| | | | | |
|---|---|---|---|---|
| 9,037,962 | B1* | 5/2015 | Vassar | G06F 40/174 |
| | | | | 715/226 |
| 2004/0255218 | A1* | 12/2004 | Tada | G06K 9/72 |
| | | | | 714/747 |
| 2006/0247912 | A1* | 11/2006 | Suzuki | G06F 40/194 |
| | | | | 704/1 |
| 2006/0285749 | A1* | 12/2006 | Eisenhart | G06K 9/033 |
| | | | | 382/188 |
| 2008/0300898 | A1* | 12/2008 | Bacha | G06Q 10/10 |
| | | | | 705/1.1 |
| 2011/0060728 | A1* | 3/2011 | Sengupta | G06F 16/93 |
| | | | | 707/690 |
| 2014/0244302 | A1* | 8/2014 | Borden | G16H 10/60 |
| | | | | 705/3 |
| 2019/0311193 | A1* | 10/2019 | Ackley | G06K 9/00442 |
| 2020/0005089 | A1* | 1/2020 | Guruprasad | G06N 20/00 |
| 2020/0110930 | A1* | 4/2020 | Simantov | G06N 20/00 |
| 2020/0387553 | A1* | 12/2020 | Tyulyaev | G06F 16/93 |

OTHER PUBLICATIONS

V. Kieu, F. Cloppet and N. Vincent, "OCR Accuracy Prediction Method Based on Blur Estimation," 2016 12th IAPR Workshop on Document Analysis Systems (DAS), Santorini, Greece, 2016, pp. 317-322, doi: 10.1109/DAS.2016.50. (Year: 2016).*

* cited by examiner

CORRECTION SUPPORT DEVICE AND CORRECTION SUPPORT PROGRAM FOR OPTICAL CHARACTER RECOGNITION RESULT

CROSS REFERENCE TO RELATED APPLICATIONS

This application claims priority to Application No. 2018-204444 filed in Japan on 30 Oct. 2018. The entire contents of this application is hereby incorporated by reference.

BACKGROUND OF THE INVENTION

Technical Field

The present invention relates to a correction support device and a correction support program for an optical character recognition result, and particularly, to a technology for supporting correction work of erroneously recognized data in optical character recognition (OCR).

Related Art

A technology called optical character recognition (OCR) of recognizing characters included in an image and converting the characters into text data (character codes capable of being used by a computer) is widely used. Although characters as image data can be converted into characters as text data, it is difficult to perform character recognition as accurate as 100%. Accordingly, it is necessary to manually correct erroneously recognized characters. In the related art, a system that supports text data correction work based on a character recognition result of OCR is known (for example, refer to JP-A-11-102414).

In a character recognition correction device described in JP-A-11-102414, a document image (scanned image) that is an OCR output source is displayed, and when a region in the displayed document image is selected, an OCR output text corresponding to the selected region is displayed in a pop-up menu. In addition, recognition accuracy parameters are determined with respect to document image regions corresponding to words in the OCR output, and a heat map is displayed to show respective recognition accuracy parameters (for example, highlighting with various colors).

Specifically, recognition accuracy parameters indicating possibility that recognition results relating to individual words are correct results are compared with a plurality of threshold values, and a region of a document image is displayed by determining display colors in correspondence with the comparison results, thereby forming a heat map of recognized words. For example, the recognition accuracy parameters are values which are assumed in advance in correspondence with combinations of characters or the like on the assumption that a character of "rn" having an arbitrary font may be recognized as a character of "m" and a recognition accuracy parameter of 60% is determined for the character pair. As described above, the heat map is displayed on the document image on the basis of the recognition accuracy parameters of respective words to guide a user to the most problematic portion of the document image with respect to an OCR output.

SUMMARY OF THE INVENTION

A location in which a character with poor recognition accuracy in a scanned image is visualized by the heat map display described in JP-A-11-102414, and thus it is possible to easily understand a site to which attention is to be paid in correction work on text data converted on the basis of the character recognition result of the OCR.

In JP-A-11-102414, the heat map display is performed on the basis of recognition accuracy parameters determined as an erroneous recognition possibility with respect to individual words, but the cause for occurrence of erroneous recognition is not limited to combinations of characters or properties of words as described in JP-A-11-102414. For example, color characters or scratching of characters, slanted characters, clogging of character interval, shading of characters, contamination of a scanned image, handwritten characters, and the like correspond to cases where erroneous recognition is likely to occur. However, the technology described in JP-A-11-102414 has a problem that the heat map display cannot be performed in correspondence with various cases where the erroneous recognition is likely to occur.

The invention has been made to solve the problem, and an object thereof is to provide a distribution image in which the degree of attention to be paid in correction work on text data is distinguished for every region in correspondence with various cases where erroneous recognition is likely to occur.

To solve the problem, in the invention, in a case where a specific site in text data output as a result of optical character recognition with respect to an original image is corrected by a user, it is detected that the correction site corresponds to which region on a layout of the original image, and region information of the correction site is recorded as correction history information. In addition, accuracy of the optical character recognition is calculated for each of individual regions on the layout of the original image on the basis of the correction history information, and a distribution image in which a difference in magnitude of accuracy is shown as a difference in a display aspect for each of individual regions is generated and displayed.

According to the invention having the above-described configuration, whenever optical character recognition is performed with respect to an original image, and a specific site in text data output as a result of the optical character recognition is corrected by a user, region information indicating that the correction site corresponds to which region on a layout of the original image is sequentially recorded as correction history information. Here, a character recognition rate in a certain region on the layout of the original image may decrease due to various cases including a format of an original document before the original image is generated by optical reading (scanning), a state of an apparatus that scans the original document and generates the original image, and the like. In this case, the number of times of correction of text data in the certain region on the original image increases, and the number of times of correction of text data in the other region tends to decrease. According to the invention, accuracy of the optical character recognition that reflects such tendency is calculated for each of individual regions on the layout of the original image, and a distribution image, in which a difference in magnitude of the accuracy is shown as a difference in a display aspect for each of individual regions, is generated. Accordingly, according to the invention, it is possible to provide a distribution image in which the degree of attention to be paid in correction work on text data is distinguished for every region in correspondence with various cases where erroneous recognition is likely to occur.

DETAILED DESCRIPTION OF THE INVENTION

First Embodiment

Figure 1:
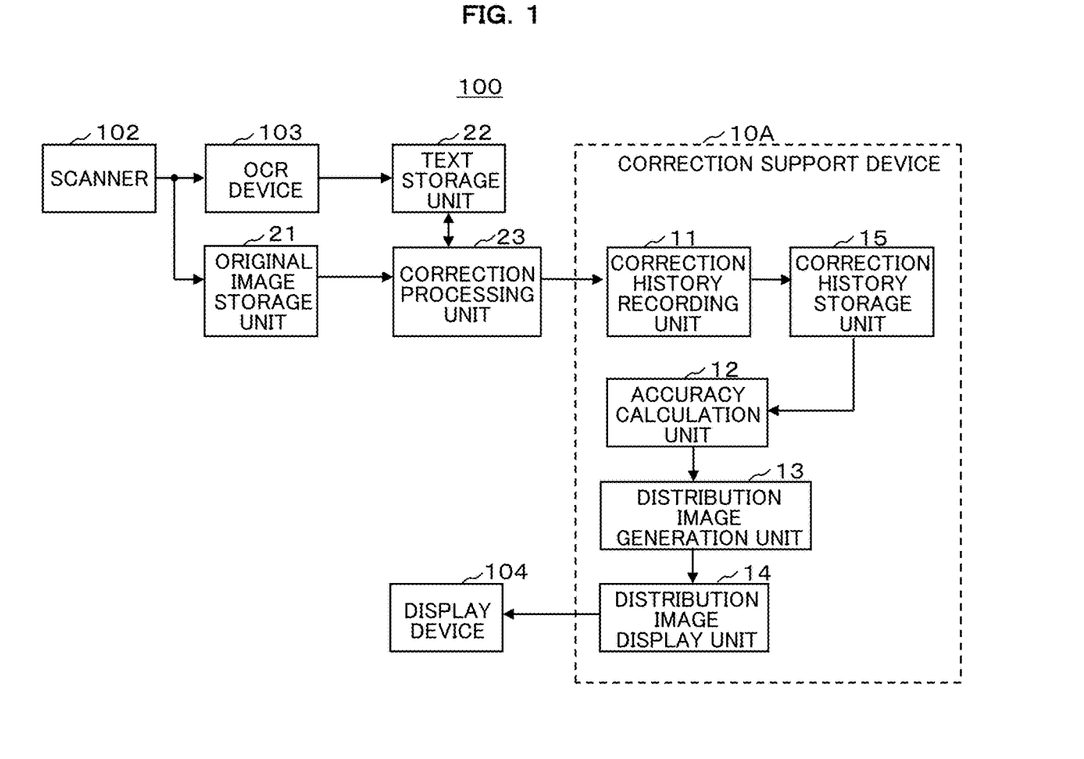
FIG. 1 is a block diagram illustrating a functional configuration example of a character recognition apparatus including a correction support device according to a first embodiment.
Figure 2:
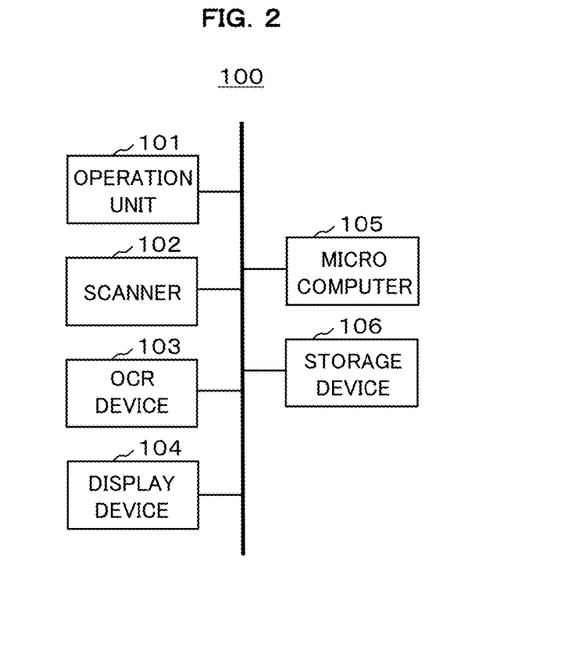
FIG. 2 is a diagram illustrating a hardware configuration example of the character recognition apparatus.

Hereinafter, a first embodiment of the invention will be described with reference to the accompanying drawings. FIG. 1 is a block diagram illustrating a functional configuration example (including a hardware configuration at a part) of a character recognition apparatus 100 including an optical character recognition result correction support device (hereinafter, simply referred to as "correction support device") 10A according to the first embodiment. FIG. 2 is a diagram illustrating a hardware configuration example of the character recognition apparatus 100. The correction support device 10A is a device that support correction work on text data converted from characters included in an original image through optical character recognition.

As illustrated in FIG. 2, the character recognition apparatus 100 includes an operation unit 101, a scanner 102, an OCR device 103, a display device 104, a microcomputer 105, and a storage device 106.

Examples of the operation unit 101 include a keyboard, a mouse, a touch panel, and the like, and a user operates these devices to give various instructions to the character recognition apparatus 100. The scanner 102 is an optical reading device, optically reads an original document on a paper medium such as a document, and converts the original document into image data. The image data generated by the scanner 102 corresponds to an "original image" in claims.

The OCR device 103 recognizes characters included in the original image generated by the scanner 102, and converts characters as an image (hereinafter, referred to as "character image") into a character code (hereinafter, referred to as "character text") to generate text data. For example, the display device 104 is a display such as a liquid crystal display device, and an organic EL display device, and displays various pieces of information. For example, the display device 104 displays the original image generated by the scanner 102, the text data generated by the OCR device 103, or the like. In addition, the display device 104 displays various screens to be described later.

The microcomputer 105 controls operations of the operation unit 101, the scanner 102, the OCR device 103, and the display device 104. In addition, the microcomputer 105 controls an operation of the correction support device 10A illustrated in FIG. 1. The storage device 106 is a non-volatile storage medium that stores various pieces of data, and examples thereof include a hard disk, a semiconductor device, and the like.

Next, description will be given of a functional configuration of the character recognition apparatus 100 including the correction support device 10A according to the first embodiment. As illustrated in FIG. 1, as a functional configuration, the character recognition apparatus 100 includes a correction history recording unit 11, an accuracy calculation unit 12, a distribution image generation unit 13, a distribution image display unit 14, a correction history storage unit 15, an original image storage unit 21, a text storage unit 22, and a correction processing unit 23. Among the units, the correction history recording unit 11, the accuracy calculation unit 12, the distribution image generation unit 13, the distribution image display unit 14, and the correction history storage unit 15 are functional configurations provided in the correction support device 10A according to the first embodiment.

The correction history recording unit 11, the accuracy calculation unit 12, the distribution image generation unit 13, the distribution image display unit 14, and the correction processing unit 23 actually include a CPU, a RAM, a ROM, or the like of the microcomputer 105 illustrated in FIG. 2, and are realized when a program stored in the RAM or the ROM, or a recording medium such as a hard disk and a semiconductor memory operates. Note that, the entirety or a part of the functions may be realized by hardware or a digital signal processor (DSP). The correction history storage unit 15, the original image storage unit 21, and the text storage unit 22 are functional configurations provided in the storage device 106 illustrated in FIG. 1.

The original image storage unit 21 stores the original image (image data of a read original document such as a document or the like) generated by the scanner 102. Here, the original image storage unit 21 stores one original image with respect to one sheet of original document.

The text storage unit 22 stores the text data generated by the OCR device 103. Here, the text storage unit 22 stores one page of text data with respect to one original image. The one page of text data has layout information that imitates a layout of the original image, and in the one page of text data, a character text is disposed at approximately the same position as that of a character image included in the original image.

The text data stored in the text storage unit 22 includes association information that correlates position information of the character image in the original image (for example, coordinate values in a two-dimensional coordinate plane with one corner of the original image set as the origin), and the character text converted from the character image. That is, when the OCR device 103 recognizes the character image included in the original image and converts the character image into the character text, position information of the character image in the original image is acquired, and the position information is stored in the text storage unit 22 in correlation with the character text.

The correction processing unit 23 corrects the text data stored in the text storage unit 22 in correspondence with an instruction from a user. It is difficult to set a recognition rate (a probability of conversion into a correct character text without erroneous recognition) in the character recognition by the OCR device 103 to 100%, and there is a possibility that an incorrect character text due to erroneous recognitions may be included in the text data. For example, a user displays the text data on a screen of the display device 104, compares the text data with an original document on hand to find an erroneously recognized character text, and operates the operation unit 101 to perform necessary correction.

In a case where correction of the character text is performed by the correction processing unit 23, the text data is updated in a state in which the correction is reflected, and the updated text data is stored in the text storage unit 22. At this time, the text data before update is overwritten with the updated text data.

In a case where a character text (corresponding to "specific site" in claims) specified in the text data (corresponding to "text data output as a result of optical character recognition" in claims) stored in the text storage unit 22 is corrected by a user, the correction history recording unit 11 detects that the correction site corresponds to which region in the layout of the original image, and records region information of the correction site in the correction history storage unit 15 as correction history information.

As described above, the text data includes the association information that correlates the position information of the character image in the original image, and the character text converted from the character image. Accordingly, in a case where any character text is corrected by the correction processing unit 23, it is possible to acquire position information of the character image in the original image due to the association information corresponding to the character text. The correction history recording unit 11 detects the position information as region information of a correction site, and causes the correction history storage unit to store the region information that is detected as correction history information.

In a case where a plurality of pieces of text data are stored in the text storage unit 22 by subjecting a plurality of sheets of original documents to the OCR processing, and necessary correction is performed by the correction processing unit 23 with respect to respective pieces of text data, a plurality of pieces of region information indicating correction sites in the pieces of text data are sequentially stored in the correction history storage unit 15. Here, when the same site in a plurality of pieces of text data is corrected, region information indicating the same correction site is accumulated in the correction history storage unit 15.

The accuracy calculation unit 12 calculates accuracy of the optical character recognition for each of individual regions on the layout of the original image on the basis of the correction history information stored in the correction history storage unit 15. Here, the individual regions represent a plurality of small regions which are set in a whole region of the original image.

Figure 3A:
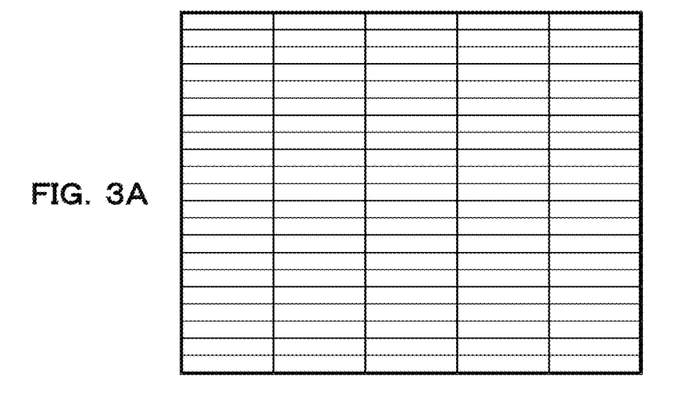
FIGS. 3A and 3B are views illustrating an example of individual regions which are set on an original image.

FIGS. 3A and 3B are views illustrating an example of individual regions. As illustrated in FIG. 3A, the individual regions may be set to respective divided regions in a case where the whole region of the original image is divided into m pieces in a vertical direction and is divided into n pieces in a horizontal direction. A division method is arbitrary, and thus the size of the divided regions can be designed in an arbitrary manner. In a case where the individual regions are set as in FIG. 3A, the respective individual regions become continuous regions adjacent to each other.

Figure 3B:
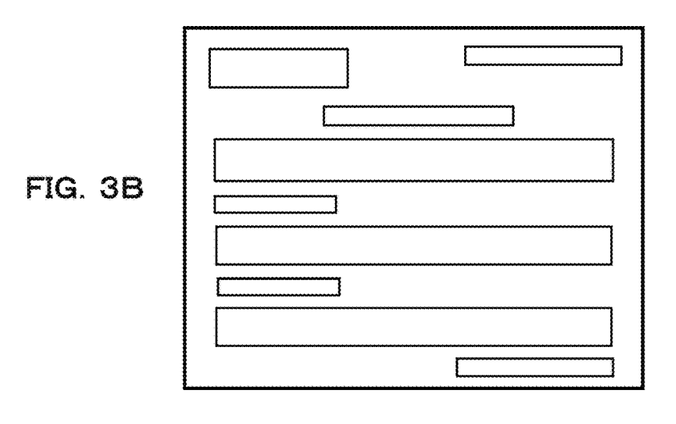

In addition, as illustrated in FIG. 3B, the individual regions may be set to non-continuous small regions which are set to be distributed in the whole region of the original image. For example, regions in which the character image included in the original image exists can be set as the individual regions. In the case of a plurality of original documents having a standard format are subjected to the OCR processing, in a plurality of original images generated from the original documents, regions of the character image exist at the same position. The regions of the character image may exist at discrete positions in the original image, and the regions may be set as the individual regions.

The accuracy calculation unit 12 calculates accuracy of the optical character recognition for each of the individual regions set on the layout of the original image on the basis of the correction history information stored in the correction history storage unit 15. The accuracy represents an index that is calculated on the basis of a situation in which correction of the character text at a position corresponding to the individual region has been performed to a certain extent. The larger the number of times of correction performed is, the smaller a value of the accuracy is, and the smaller the number of times of correction performed is, the larger the value of the accuracy is.

For example, the accuracy calculation unit 12 calculates a reciprocal of a ratio of the number of correction performed as the accuracy with the number of text data stored in the text storage unit 22 set as a parameter. The number of times of correction of the character text in the individual region can be obtained by counting the number of correction sites in which the same region information is stored on the basis of the region information of the correction sites which is stored in the correction history storage unit 15. Note that, in a case where the number of times of correction performed is zero, a value becomes ∞ when a reciprocal is taken, but a value of the accuracy in this case may be set to ∞, or may be set to a predetermined highest value.

Note that, here, description has been made on the assumption that the accuracy is calculated with the number of text data stored in the text storage unit 22 set as the parameter, but the invention is not limited thereto. For example, the accuracy may be calculated by setting the number of text data generated from an original document having a certain specific standard format in the text data stored in the text storage unit 22 is set as the parameter. In this case, for example, when the original document is read by the scanner 102 and the text data is generated by the OCR device 103, a situation in which the original document is an original document having a specific standard format is designated by an operation of the operation unit 101, and text data generated through the designation is stored in the text storage unit 22 in a state capable of being identified from the other text data. In this case, it is possible to calculate accuracy with respect to text data generated from an original document having a specific standard format.

Here, in a case where the individual regions are set to positions of character images as in FIG. 3B, a position of each of the individual regions and a position at which each character text is disposed match each other. Accordingly, a value obtained by counting correction sites in which the same region information is stored on the basis of region information of the correction sites stored in the correction history storage unit 15 (the number of times of correction of the character text in the region information) becomes a value that can be used as the number of times of correction of the character text in a corresponding individual region, and it is possible to calculate the accuracy for every individual region on the basis of the above-described situation.

On the other hand, in a case where the continuous divided regions are set as the individual regions as in FIG. 3A, it cannot be said that a position of each of the individual regions and a position at which each character text is disposed (that is, a position that is indicated by region information of a correction site which is stored in the correction history storage unit 15) match each other. In this case, accuracy calculated on the basis of the region information of the correction site may be regarded as accuracy of one or a plurality of individual regions of which at least a part overlaps the position indicated by the region information of the correction site.

The distribution image generation unit 13 generates a distribution image in which a difference in magnitude of accuracy is shown as a difference in a display aspect for each of the individual regions on the basis of accuracy calculated by the accuracy calculation unit 12 for each of the individual regions. For example, with respect to the whole layout of the original image, the distribution image generation unit 13 generates a whole distribution image in which a difference in magnitude of accuracy is shown as a difference in a display aspect for each of the individual regions on the basis of accuracy calculated by the accuracy calculation unit 12 for each of the individual regions included in the whole layout.

For example, the display aspect that is changed for each of the individual regions is a display color. For example, the distribution image generation unit 13 classifies the magnitude of the accuracy into three kinds in accordance with two threshold values, and generates sub-distribution images indicating the individual regions with different display colors in correspondence with the classification.

Specifically, an individual region pertaining to a classification in which the accuracy is the largest is indicated by a blue color, an individual region pertaining to a classification in which the accuracy is approximately intermediate is indicated by a yellow color, and an individual region pertaining to a classification in which the accuracy is the smallest is indicated by a red color or the like. The individual region pertaining to the classification in which the accuracy is the largest may be set to a colorless region (the same color as a background color). Note that, as a display aspect that is changed for every individual region, a display density of the same color or the type of shading, or the like may be used instead of the display color.

Here, description has been given of an example in which the distribution image generation unit 13 generates whole distribution images corresponding to the whole layout of the original image, but the invention is not limited thereto. For example, with respect to a partial region designated in the whole layout of the original image by an operation of the operation unit 101, the distribution image generation unit 13 may generate a partial distribution image in which a difference in magnitude of accuracy is shown as a difference in a display aspect for each of the individual regions on the basis of accuracy calculated by the accuracy calculation unit 12 for each of the individual regions included in the designated partial region.

The distribution image display unit 14 causes the display device 104 to display the distribution image generated by the distribution image generation unit 13. For example, when a user operates the operation unit 101 to give an instruction for the correction support device 10A to display the distribution image, the distribution image generation unit 13 generates the distribution image, and the distribution image display unit 14 causes the display device 104 to display the generated distribution image.

Here, the distribution image display unit 14 may display a color distribution image (heat map image) in which a display color is changed for every individual region, or may subject the color distribution image to translucentizing processing and display the color distribution image in a manner of being superimposed on the original image. In addition, the distribution image generation unit 13 may perform processing for applying a color distribution to the original image to generate a processed image including the color distribution on the original image instead of the aspect in which the distribution image display unit 14 subjects the color distribution image to the translucentizing processing and superimposes the color distribution image on the original image.

Figure 4:
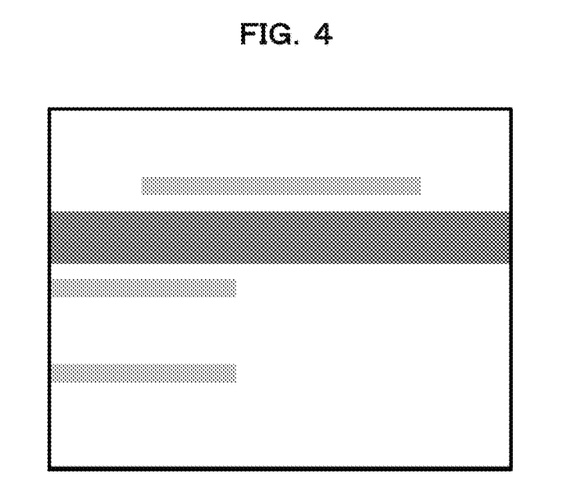
FIG. 4 is a view illustrating an example of a distribution image that is displayed on a display device under control of a distribution image display unit.

FIG. 4 is a view illustrating an example of the distribution image that is displayed on the display device 104. FIG. 4 illustrates an example of the whole distribution image (heat map image) that is displayed in a case where the individual regions are set as in FIG. 3A. In addition, FIG. 4 illustrates an example of a distribution image in which an individual region pertaining to a classification in which the accuracy is the largest is set to a colorless region, and an individual region pertaining to a classification in which the accuracy is approximately intermediate and an individual region pertaining to a classification in which the accuracy is the smallest are displayed with different colors.

A user can understand that accuracy of which region is low as a result of reflection of a past correction history, that is, many erroneous recognitions have occurred in which region at a glance when viewing the distribution image. In a case where the user understands the region in which the many erroneous recognitions have occurred, when correction of the text data is performed by the correction processing unit 23, it is possible to obtain a guide indicating which regions of the text data displayed on the display device 104 and the original document on hand are preferable to be intensively confirmed, and it is possible to effectively perform correction work.

Note that, as a case where the erroneous recognition in a certain specific region increases even through a plurality of original documents which are different in character image content are subjected to the OCR processing, various factors can be considered. For example, in a case where an original document with a standard format is subjected to the OCR processing, with respect to a specific region, a character recognition rate in a certain region on the layout of the original image may decrease due to formats of the original document, from which the original image is generated through scanning, such as a format in which characters are in a color other than black, a format in which characters are in a color close to a background color, a format in which characters are slanted, and a format of handwritten characters.

In addition, regardless of whether or not the original document is an original document with the standard format, the character recognition rate in a certain region on the layout of the original image may decrease due to a state of the scanner 102 or the OCR device 103, or the like. For example, when the original document is a document that is stamped out by FAX, characters in a specific region may be frequently scratched. In addition, when a document platen of the scanner 102 is scratched or contaminated, a dot group having a fixed shape may be formed in a specific region on the original image.

In this case, relatively many erroneous recognitions occur in a certain region on the original image, and the number of times of correction of a character text converted from a character image in the region tends to increase, and the number of times of correction of a character text converted from a character image in a region other than the certain region tends to decrease. According to this embodiment, accuracy that reflects the tendency is calculated for each of individual regions on a layout of an original image, and a distribution image in which a difference in magnitude of accuracy is shown as a difference in a display color for every individual region is generated. Accordingly, according to this embodiment, it is possible to provide a user with a distribution image in which the degree of attention to be paid in correction work on text data is distinguished for every region in correspondence with various cases where erroneous recognition is likely to occur. The user views the distribution image, and can effectively perform correction work on the text data.

Second Embodiment

Figure 5:
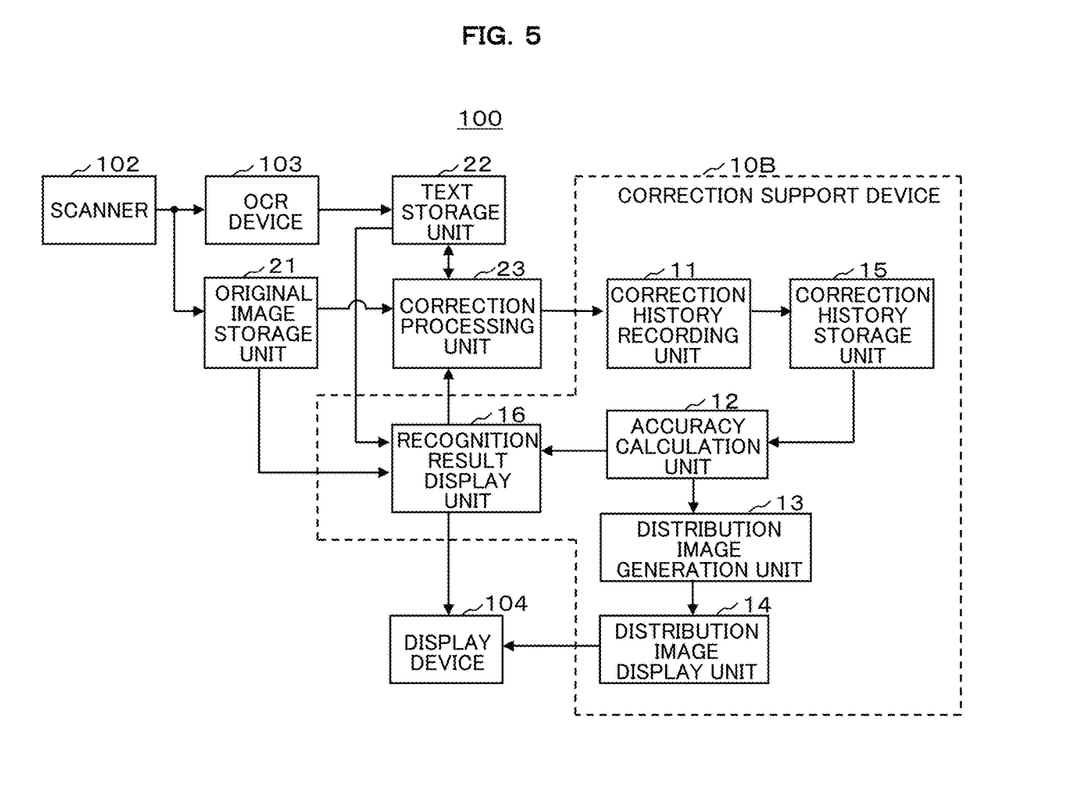
FIG. 5 is a block diagram illustrating a functional configuration example of a character recognition apparatus including a correction support device according to a second embodiment.

Next, a second embodiment of the invention will be described with reference to the accompanying drawings. FIG. 5 is a block diagram illustrating a functional configuration example (including a hardware configuration at a part) of the character recognition apparatus 100 including a correction support device 10B according to the second embodiment. Note that, in FIG. 5, a constituent element to which the same reference numeral as the reference numeral illustrated in FIG. 1 is given has the same function, and thus redundant description will be omitted.

As illustrated in FIG. 5, the correction support device 10B according to the second embodiment further includes a recognition result display unit 16 as a functional configuration. The recognition result display unit 16 actually includes a CPU, a RAM, a ROM, or the like of the microcomputer 105 illustrated in FIG. 2, and is realized when a program stored in the RAM or the ROM, or a recording medium such as a hard disk and a semiconductor memory operates.

The recognition result display unit 16 causes the display device 104 to display the original image stored in the original image storage unit 21, receives designation of an arbitrary partial region on the displayed original image, and displays partial text data that is a result of optical character recognition in the designated partial region as an additional screen. Here, the designation of the arbitrary partial region on the displayed original image is performed through an operation of the operation unit 101 by a user. In addition, the partial text data is generated by using the text data stored in the text storage unit 22.

As described above, the text data stored in the text storage unit 22 has layout information that imitates the layout of the original image. Accordingly, when receiving the designation of the arbitrary partial region on the original image, the recognition result display unit 16 can specify a region on the text data corresponding to the partial region designated on the original image from the layout information, and can generate text data of the specified partial region as partial text data. The recognition result display unit 16 causes the display device 104 to display the partial text data generated as described above. For example, the partial text data is pop-up displayed in a manner of being superimposed on the original image displayed on the display device 104.

When causing the display device 104 to display the partial text data, the recognition result display unit 16 performs display in which a difference in magnitude of accuracy is shown as a difference in a display aspect for every text region corresponding to each of the individual regions on additional screen display (pop-up display) on the basis of the accuracy calculated by the accuracy calculation unit 12 for each of the individual regions included in the designated partial region.

The text regions corresponding to the individual regions represents regions set on the text data as in the individual regions set on the original image. For example, in a case where the individual regions are set on the original image as in FIG. 3A, the individual regions set on the text data in a similar manner to FIG. 3A are the text regions. On the other hand, in a case where the individual regions are set on the original image as in FIG. 3B, the individual regions set on the text data in a similar manner to FIG. 3B are the text regions. For example, the individual text regions are set as a text box, and a display color in the box is changed in correspondence with accuracy. Note that, a method of setting the display color with respect to the text regions is not limited thereto.

Figure 6A:
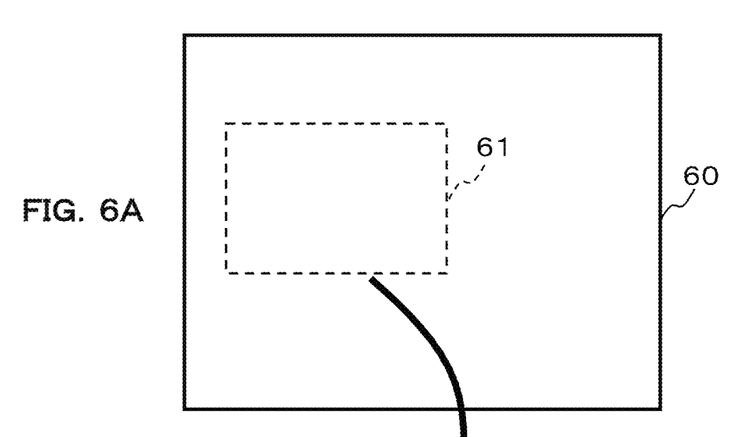
FIGS. 6A and 6B are views illustrating an example of information that is displayed on the display device under control of a recognition result display unit.
Figure 6B:
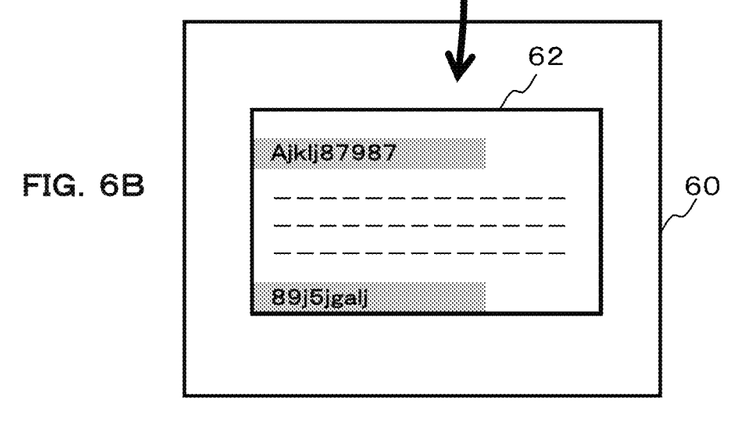

FIGS. 6A and 6B are views illustrating an example of information that is displayed on the display device 104 under control of the recognition result display unit 16. In FIGS. 6A and 6B, a region indicated by a reference numeral 60 is a region (for example, the entirety of a display screen of the display device 104) in which the original image is shown. A region indicated by a reference numeral 61 is a partial region designated on the original image by a user. A region indicated by a reference numeral 62 is a pop-up screen of the partial text data displayed in correspondence with the partial region designated on the original image. Note that, here, description of specific drawing of the original image in the region 60 is omitted. In addition, description of the pop-up screen 62 is simplified.

Here, an example of the pop-up screen 62 displayed in the case of setting the individual regions as in FIG. 3A is illustrated. That is, on the basis of accuracy calculated by the accuracy calculation unit 12 with respect to individual regions included in the partial region 61 designated on the original image among the individual regions set with respect to the whole region of the original image as in FIG. 3A, the recognition result display unit 16 generates a distribution image in which a display color is changed for every text region corresponding to the individual regions, and displays the distribution image on the pop-up screen 62.

A user can directly correct, on the pop-up screen 62, a character text on the partial text data displayed on the pop-up screen 62. At this time, on the pop-up screen 62, an individual text region as a result of reflection of a past correction history is displayed in each color, and thus the user can understand that accuracy of which text region is low, that is, many erroneous recognitions have occurred in which text region at a glance. According to this, when performing correction of the partial text data on the pop-up screen 62 by the correction processing unit 23, the user can obtain a guide indicating which regions on the pop-up screen 62 and an original document on hand are preferable to be intensively confirmed, and can effectively perform correction work.

Note that, display and non-display of the pop-up screen 62 (a non-display state illustrated in FIG. 6A and a display state illustrated in FIG. 6B) may be switched from each other in a toggle manner through a specific operation (for example, an operation of a specific key on a keyboard, or the like) in the operation unit 101. In this case, when performing correction of the partial text data displayed on the pop-up screen 62, it is not necessary to compare the partial text data with the original document on hand, and it is possible to compare the partial text data and the original image while switching display and non-display of the pop-up screen 62 in a toggle manner, and thus it is possible to more effectively perform correction work.

Third Embodiment

Figure 7:
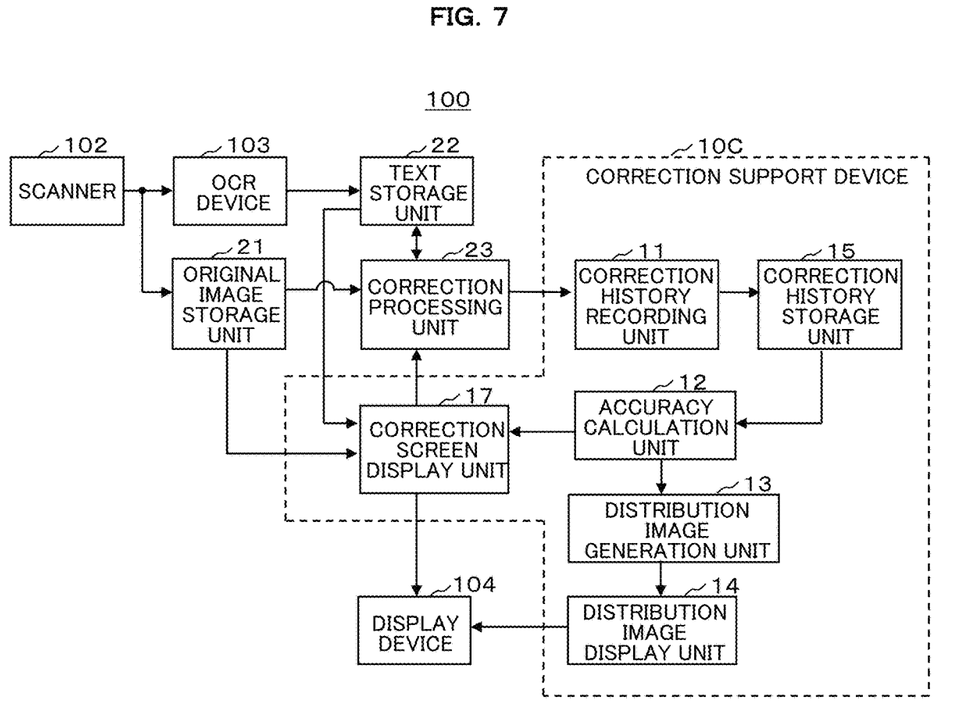
FIG. 7 is a block diagram illustrating a functional configuration example of a character recognition apparatus including a correction support device according to a third embodiment.

Next, a third embodiment of the invention will be described with reference to the accompanying drawings. FIG. 7 is a block diagram illustrating a functional configuration example (including a hardware configuration at a part) of the character recognition apparatus 100 including a correction support device 10C according to the third embodiment. Note that, in FIG. 7, a constituent element to which the same reference numeral as the reference numeral illustrated in FIG. 1 is given has the same function, and thus redundant description will be omitted.

As illustrated in FIG. 7, the correction support device 10C according to the third embodiment further includes a correction screen display unit 17 as a functional configuration. The correction screen display unit 17 actually includes a CPU, a RAM, a ROM, or the like of the microcomputer 105 illustrated in FIG. 2, and is realized when a program stored in the RAM or the ROM, or a recording medium such as a hard disk and a semiconductor memory operates.

The correction screen display unit 17 receives designation of an arbitrary partial region on the original image, and displays a correction screen in which a partial original image of the partial region that is designated, and partial text data that is a result of optical character recognition in the designated partial region are arranged in parallel. Here, the designation of the arbitrary partial region on the original image is performed through an operation of the operation unit 101 by a user. In addition, the partial original image is generated by using the original image stored in the original image storage unit 21, and the partial text data is generated by using the text data stored in the text storage unit 22.

The correction screen display unit 17 performs display in which a difference in magnitude of accuracy is shown as a difference in a display aspect for each of individual regions on the original image of the partial region on the correction screen on the basis of the accuracy calculated by the accuracy calculation unit 12 for each of the individual regions included in the designated partial region. For example, the correction screen display unit 17 generates a color distribution image in which a display color is changed for every individual region in correspondence with the accuracy, subjects the color distribution image to translucentizing processing, and displays the color distribution image in a manner of being superimposed on the partial original image. Alternatively, a partial original image in which a display color is changed for every individual region in correspondence with the accuracy may be generated and displayed.

Figure 8A:
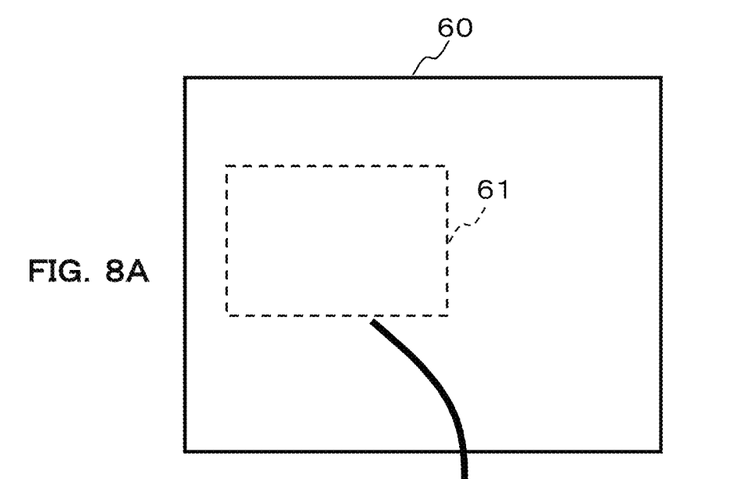
FIGS. 8A and 8B are views illustrating an example of information that is displayed on the display device under control of a correction screen display unit.
Figure 8B:
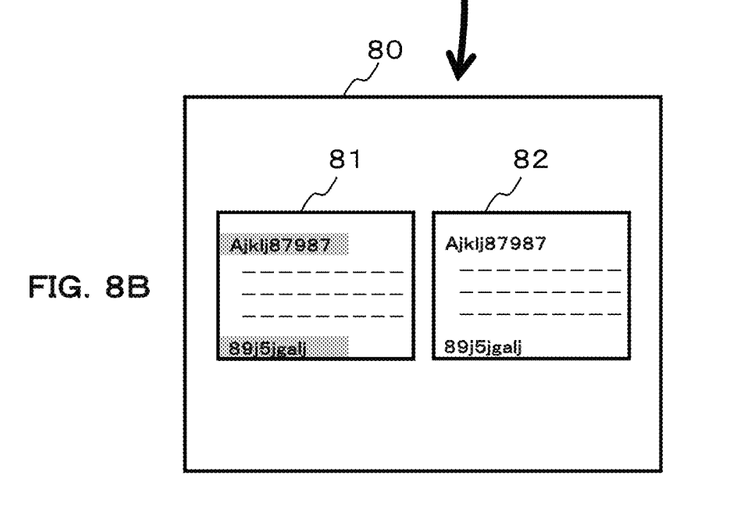

FIGS. 8A and 8B are views illustrating an example of information displayed on the display device 104 under control of the correction screen display unit 17. Note that, in FIGS. 8A and 8B, the same reference numeral will be given to the same element as the element illustrated in FIGS. 6A and 6B. FIG. 8A illustrates the same state as in FIG. 6A.

FIG. 8B illustrates a correction screen 80 that is displayed in correspondence with a partial region 61 designated on the original image. In the correction screen 80, a partial original image corresponding to the partial region 61 designated on the original image by a user is displayed in a left region 81. In addition, partial text data corresponding to the designated partial region 61 is displayed in a right region 82. Here, with regard to the partial original image displayed in the left region 81, display in which a difference in magnitude of accuracy calculated for each of individual regions included in the partial region 61 is shown as a difference in a display color is performed. Note that, in the partial text data displayed in the right region 82, the difference in the magnitude of the accuracy may be shown as the difference in the display color for every text region.

Here, a display example in the case of setting the individual region as in FIG. 3A is illustrated. Specifically, the correction screen display unit 17 generates a distribution image in which a display color is changed for each of individual regions on the basis of accuracy calculated by the accuracy calculation unit 12 with respect to individual regions included in the partial region 61 designated on the original image among the individual regions set with respect to the whole region of the original image as in FIG. 3A, subjects the distribution image to translucentizing processing, and displays the color distribution image in a manner of being superimposed on the partial original image. Alternatively, a partial original image in which a display color is changed for every individual region in correspondence with the accuracy may be generated and displayed.

A user can directly correct a character text on the partial text data displayed in the right region 82 of the correction screen 80. At this time, in the left region 81 of the correction screen 80, the partial original image is displayed in a state in which individual regions are distinguished as a result of reflection of a past correction history, and thus the user can understand that accuracy of which region is low, that is, many erroneous recognitions have occurred in which region at a glance. In addition, the user can perform correction while comparing the partial original image and the partial text data on one screen, and thus it is possible to significantly improve efficiency of correction work.

Note that, a method of arranging the partial original image of the partial region designated on the original image, and the partial text data corresponding to the designated partial region in parallel is not limited to the example illustrated in FIGS. 8A and 8B. For example, in FIGS. 8A and 8B, the partial original image and the partial text data is displayed in parallel in a horizontal direction, but may be displayed in parallel in a vertical direction.

Figure 9A:
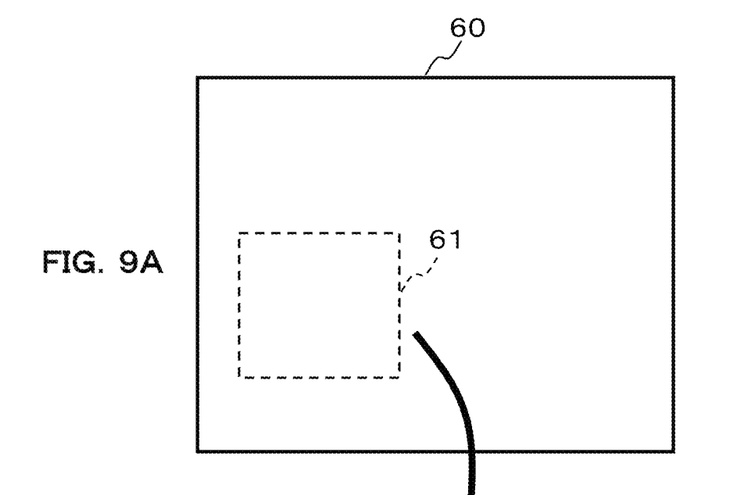
FIGS. 9A and 9B are views illustrating another example of information that is displayed on the display device under control of the correction screen display unit.
Figure 9B:
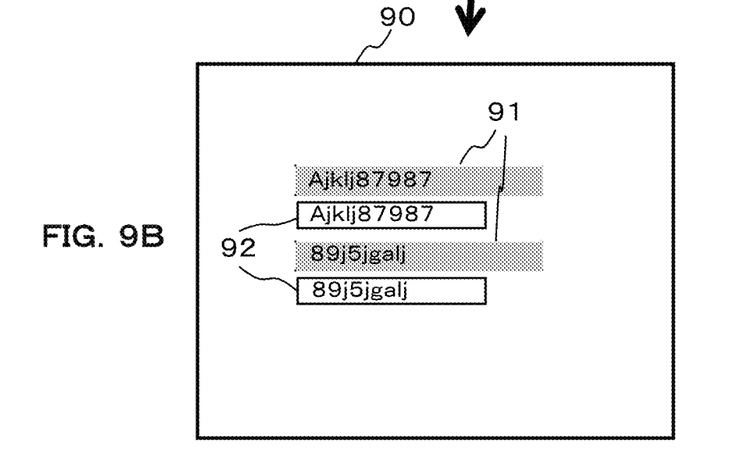

In addition, FIGS. 8A and 8B illustrates an example in which the partial original image and the partial text data are displayed in parallel in a state of maintaining the original layout, but display may be performed by changing the layout for easy viewing. For example, in a case where the individual regions are set with respect to the whole region of the original image as in FIG. 3A, individual regions including a character image are extracted among the individual regions included in the designated partial region 61, and extracted individual regions 91 and text region 92 corresponding to the individual regions 91 may be displayed in parallel as illustrated in FIGS. 9A and 9B. This is also applicable to a case where the individual regions are set as in FIG. 3B. Note that, in FIGS. 9A and 9B, in the designated partial region 61, only regions including the entirety of the individual regions are extracted and arranged.

Note that, the second embodiment and the third embodiment may be applied in combination.

In addition, any of the first to third embodiments merely illustrate an example of embodiment when performing the invention, and it should not be understood that the technical scope of the invention is limited by the embodiments. That is, the invention can be carried out in various embodiments without being departed from the gist or important characteristics.

What is claimed is:

1. A correction support device for an optical character recognition result, the correction support device supporting correction work on text data converted from characters included in an original image by optical character recognition, the correction support device comprising:
    a correction history recording unit that detects that a correction site corresponds to which region on a layout of the original image in a case where a specific site in the text data output as a result of the optical character recognition is corrected by a user, and records region information of the correction site as correction history information;
    an accuracy calculation unit that calculates accuracy of the optical character recognition for each of individual regions on the layout of the original image on the basis of the correction history information that is recorded by the correction history recording unit;
    a distribution image generation unit that generates a distribution image in which a difference in magnitude of the accuracy is shown as a difference in a display aspect for each of the individual regions on the basis of the accuracy calculated by the accuracy calculation unit for each of the individual regions; and
    a distribution image display unit that displays the distribution image generated by the distribution image generation unit.

2. The correction support device for an optical character recognition result according to claim 1,
    wherein with respect to the whole layout of the original image, the distribution image generation unit generates a whole distribution image in which a difference in magnitude of accuracy is shown as a difference in a display aspect for each of individual regions on the basis of the accuracy calculated by the accuracy calculation unit for each of the individual regions included in the whole layout.

3. The correction support device for an optical character recognition result according to claim 1,
    wherein with respect to a partial region designated in the whole layout of the original image, the distribution image generation unit generates a partial distribution image in which a difference in magnitude of accuracy is shown as a difference in a display aspect for each of individual regions on the basis of the accuracy calculated by the accuracy calculation unit for each of the individual regions included in the designated partial region.

4. The correction support device for an optical character recognition result according to claim 1, further comprising:
    a recognition result display unit that displays the original image, receives designation of an arbitrary partial region on the displayed original image, and displays partial text data that is a result of the optical character recognition in the designated partial region as an additional screen,
    wherein the recognition result display unit performs display in which a difference in magnitude of accuracy is shown as a difference in a display aspect for every text region corresponding to each of individual regions on additional screen display on the basis of the accuracy calculated by the accuracy calculation unit for each of the individual regions included in the designated partial region.

5. The correction support device for an optical character recognition result according to claim 1, further comprising:
    a correction screen display unit that receives designation of an arbitrary partial region on the original image, and displays a correction screen in which a partial original image of the partial region that is designated, and partial text data that is a result of the optical character recognition in the designated partial region are arranged in parallel,
    wherein the correction screen display unit performs display in which a difference in magnitude of accuracy is shown as a difference in a display aspect for each of individual regions or every text region corresponding to the individual region on the partial original image or the partial text data of the correction screen on the basis of the accuracy calculated by the accuracy calculation unit for each of the individual regions included in the partial region that is designated.

6. A correction support program, stored on a non-transitory computer readable medium, for an optical character recognition result, the program providing a function of supporting correction work on text data converted from characters included in an original image by optical character recognition, the program causing a computer to function as:
    a correction history recording unit that detects that a correction site corresponds to which region on a layout of the original image in a case where a specific site in the text data output as a result of the optical character recognition is corrected by a user, and records region information of the correction site as correction history information;
    an accuracy calculation unit that calculates accuracy of the optical character recognition for each of individual regions on the layout of the original image on the basis of the correction history information that is recorded by the correction history recording unit;
    a distribution image generation unit that generates a distribution image in which a difference in magnitude of the accuracy is shown as a difference in a display aspect for each of the individual regions on the basis of the accuracy calculated by the accuracy calculation unit for each of the individual regions; and
    a distribution image display unit that displays the distribution image generated by the distribution image generation unit.

* * * * *